United States Patent
Huang et al.

(10) Patent No.: US 10,249,252 B2
(45) Date of Patent: Apr. 2, 2019

(54) COLOR CAST COMPENSATION METHOD

(71) Applicant: Shenzhen China Star Optoelectronics Technology Co., Ltd., Shenzhen (CN)

(72) Inventors: Xiaoyu Huang, Shenzhen (CN); Dongsheng Guo, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 281 days.

(21) Appl. No.: 15/303,744

(22) PCT Filed: Jul. 19, 2016

(86) PCT No.: PCT/CN2016/090382
§ 371 (c)(1),
(2) Date: Oct. 13, 2016

(87) PCT Pub. No.: WO2017/206286
PCT Pub. Date: Dec. 7, 2017

(65) Prior Publication Data
US 2017/0352317 A1  Dec. 7, 2017

(30) Foreign Application Priority Data

Jun. 3, 2016 (CN) .......................... 2016 1 0388688

(51) Int. Cl.
*G09G 3/36* (2006.01)
*G02F 1/1343* (2006.01)
(Continued)

(52) U.S. Cl.
CPC ..... *G09G 3/3607* (2013.01); *G02F 1/134309* (2013.01); *G02F 1/136286* (2013.01); *G09G 3/3648* (2013.01); *G09G 5/06* (2013.01);
*G02F 2001/134345* (2013.01); *G02F 2201/123* (2013.01); *G09G 2310/027* (2013.01);
(Continued)

(58) Field of Classification Search
CPC ......... G02F 1/134309; G02F 1/136286; G02F 2001/134345; G02F 2201/123; G09G 5/06; G09G 2310/027; G09G 2310/0291; G09G 2320/0285; G09G 2320/0666
See application file for complete search history.

(56) References Cited

U.S. PATENT DOCUMENTS

| 6,466,191 | B1 | 10/2002 | Choi et al. |
| 2001/0022570 | A1* | 9/2001 | Chang ................ G09G 3/3688 345/98 |

(Continued)

FOREIGN PATENT DOCUMENTS

| CN | 101383128 | 3/2009 |
| CN | 101789224 | 7/2010 |

(Continued)

*Primary Examiner* — Mark Edwards

(57) ABSTRACT

The present disclosure provides a color cast compensation method, which includes: obtaining a first gray value of a first pixel electrode currently to be charged; determining a second gray value of a second pixel electrode on a previous row sharing a same data line with the first pixel electrode; and obtaining a target charging voltage of the first pixel electrode based on the first gray value and the second gray value. The present invention solves the problem of display quality affected by rough fonts, caused by jaggies appearing on a triple-gate type display panel.

16 Claims, 4 Drawing Sheets

(51) Int. Cl.
*G02F 1/1362* (2006.01)
*G09G 5/06* (2006.01)

(52) U.S. Cl.
CPC .............. *G09G 2310/0291* (2013.01); *G09G 2320/0285* (2013.01); *G09G 2320/0666* (2013.01)

(56) References Cited

U.S. PATENT DOCUMENTS

| | | | |
|---|---|---|---|
| 2009/0066627 | A1 | 3/2009 | Yin |
| 2010/0149445 | A1* | 6/2010 | Lee .................. G02F 1/136286 349/38 |
| 2010/0182333 | A1 | 7/2010 | Chiang |
| 2011/0234649 | A1* | 9/2011 | Ooishi ................. G09G 3/3648 345/690 |

FOREIGN PATENT DOCUMENTS

| | | |
|---|---|---|
| CN | 105047156 | 11/2015 |
| KR | 10-2014-0148324 | 12/2014 |

\* cited by examiner

COLOR CAST COMPENSATION METHOD

RELATED APPLICATIONS

This application is a National Phase of PCT Patent Application No. PCT/CN2016/090382 having International filing date of Jul. 19, 2016, which claims the benefit of priority of Chinese Patent Application No. 201610388688.4 filed on Jun. 3, 2016. The contents of the above applications are all incorporated by reference as if fully set forth herein in their entirety.

FIELD AND BACKGROUND OF THE INVENTION

The present invention relates to driving circuit technology, and more particularly, to a color cast compensation method.

In order to solve the problem of residual images in a liquid crystal display, over driving is usually utilized in the existing skills. Each stable state of liquid crystal molecules corresponds to a specific voltage. When a voltage is applied to an electrode, the liquid crystal molecules will rotate but will not instantly rotate to a target state. Instead, the liquid crystal molecules achieve the state after a certain amount of response time. The higher the voltage is, the faster the liquid crystal molecules rotate. In a traditional liquid crystal display, the driving voltage applied to the liquid crystal molecules is a voltage corresponding to the target state. Since different gray levels correspond to different voltages as well as the angles the liquid crystal molecules need to rotate at are different, this results in significantly different response time for different gray levels. In a liquid crystal display adopting the over driving technology, the applied driving voltage is slightly higher than the voltage corresponding to the target state in the beginning such that the liquid crystal molecules rotate more fast, and the voltage drops down to the voltage corresponding to the target state after the target state is achieved so as to maintain the state. This can effectively shorten the response time and even the response time for different gray levels.

In thin-film-transistor liquid crystal displays, triple-gate type adopts pixel inversion driving in accompanying with column inversion in order to save power consumption. However, the charging time of the pixel electrode of the triple-gate type is very short and insufficient charge for the pixel electrode is easily occurred. When foreground and background color difference is large, jaggies may appear due to insufficient charge for the pixel electrodes corresponding to foreground contour parts, and fonts become rough and it exercises a great influence on the display quality. In addition, for some special screen images such as a screen image formed by dark and bright pixels interlaced with each other and a screen image formed by two dark pixels and two bright pixels adjacent to and interlaced with each other, performing color cast compensation on the triple-gate LCD panel will make noise points appear on the screen image and the color cast compensation results may backfire. The afore-described technical problems affect the display effects of the liquid crystal display panels and are required to be solved.

SUMMARY OF THE INVENTION

The objective of the present invention is to provide a color cast compensation method for solving the problems below. In the existing skills, the charging time of the pixel electrode of the triple-gate type is very short and insufficient charge for the pixel electrode is easily occurred, and therefore when foreground and background color difference is large, jaggies may appear due to insufficient charge for the pixel electrodes corresponding to foreground contour parts, and fonts become rough and it exercises a great influence on the display quality. Further, for a screen image formed by dark and bright pixels interlaced with each other or a screen image formed by two dark pixels and two bright pixels adjacent to and interlaced with each other, performing color cast compensation on the triple-gate LCD panel will make noise points appear on the screen image and the color cast compensation results may backfire.

The technical schemes provided in the present invention are described below.

A color cast compensation method, utilized for a triple-gate liquid crystal display (LCD) panel, the triple-gate LCD panel comprising a plurality of rows of gate lines and a plurality of columns of data lines, said method comprising the steps of: obtaining a first row and column position of a first pixel electrode currently to be charged and a first gray value of a portion of an image corresponding to the first pixel electrode; determining, based on the first row and column position, a second row and column position of a second pixel electrode on a previous row sharing a same data line with the first pixel electrode, and obtaining a second gray value of the second pixel electrode that is stored in a row data buffer thereof; and obtaining a target charging voltage of the first pixel electrode based on the first gray value and the second gray value, and charging the first pixel electrode according to the target charging voltage or charging the first pixel electrode according to a charging voltage corresponding to the first gray value, the target charging voltage making image brightness corresponding to the first pixel electrode achieve the brightness corresponding to the first gray value; wherein obtaining the target charging voltage of the first pixel electrode based on the first gray value and the second gray value comprises: inquiring a look up table by using the first gray value and the second gray value to obtain a compensation gray value of the first pixel electrode; and obtaining, based on the compensation gray value, the charging voltage corresponding to the first pixel electrode and serving the same as the target charging voltage; wherein after charging the first pixel electrode according to the target charging voltage, said method further comprises: storing the first gray value in the row data buffer corresponding to the first pixel electrode and serving the same as gray value data of a previous row for a third pixel electrode on a next row, where the third pixel electrode and the first pixel electrode share a same data line.

Preferably, before obtaining the first row and column position of the first pixel electrode currently to be charged and the first gray value of a portion of the image corresponding to the first pixel electrode, said method further comprises: determining relative position between the first pixel electrode and the data line to which an initial pixel electrode on a first row and a first column is connected so as to determine an array architecture of the liquid crystal display panel.

Preferably, the second row and column position on the liquid crystal display panel at where the second pixel electrode is located is obtained according to the first row and column position and the array architecture of the liquid crystal display panel.

Preferably, the second gray value is determined to be 0 if the first pixel electrode is located on a first row on the triple-gate LCD panel.

Preferably, before obtaining the target charging voltage of the first pixel electrode based on the first gray value and the second gray value, and charging the first pixel electrode according to the target charging voltage or charging the first pixel electrode according to the charging voltage corresponding to the first gray value, said method further comprises: obtaining N gray values of pixel electrodes in sequence on a row where the first pixel electrode is located on, in which N is an even number greater than or equal to 8, and sequentially taking every two adjacent entities of the N gray values as a group and subtracting the gray value of an even column and the gray value of an odd column in each group from each other to obtain N/2 first gray value differences $S_1$ to $S_{N/2}$; sequentially taking every two adjacent entities of the N/2 first gray value differences as a group and subtracting the gray value of the even column and the gray value of the odd column in each group from each other to obtain N/4 second gray value differences $E_1$ to $E_{N/4}$; and determining to charge the first pixel electrode according to the target charging voltage or to charge the first pixel electrode according to the charging voltage corresponding to the first gray value, based on the relationship between the N/4 second gray value differences $E_1$ to $E_{N/4}$ and a predetermined first gray value difference threshold and the relationship between the N/2 first gray value differences $S_1$ to $S_{N/2}$ and a predetermined second gray value difference threshold, where the second gray value difference threshold is greater than the first gray value difference threshold.

Preferably, determining to charge the first pixel electrode according to the target charging voltage or to charge the first pixel electrode according to the charging voltage corresponding to the first gray value comprises: charging the first pixel electrode according to the charging voltage corresponding to the first gray value if the N/4 second gray value differences $E_1$ to $E_{N/4}$ are all equal to 0.

Preferably, determining to charge the first pixel electrode according to the target charging voltage or to charge the first pixel electrode according to the charging voltage corresponding to the first gray value may comprise: determining whether or not the N/2 first gray value differences $S_1$ to $S_{N/2}$ are all greater than the second gray value difference threshold if the N/4 second gray value differences $E_1$ to $E_{N/4}$ are all less than the first gray value difference threshold; and if not, using the target charging voltage to charge the first pixel electrode.

Preferably, determining whether or not the N/2 first gray value differences $S_1$ to $S_{N/2}$ are all greater than the second gray value difference threshold comprises: obtaining the difference values between the gray values of the previous two pixel electrodes on a current row and corresponding gray values of a previous row stored in the row data buffer and determining whether or not the two difference values are all equal to the first gray value differences $S_1$ to $S_{N/2}$ if the N/2 first gray value differences $S_1$ to $S_{N/2}$ are all greater than the second gray value difference threshold; and if yes, using the charging voltage corresponding to the first gray value to charge the first pixel electrode; otherwise, using the target charging voltage to charge the first pixel electrode.

A color cast compensation method, utilized for a triple-gate liquid crystal display (LCD) panel, the triple-gate LCD panel comprising a plurality of rows of gate lines and a plurality of columns of data lines, said method comprising the steps of: obtaining a first row and column position of a first pixel electrode currently to be charged and a first gray value of a portion of an image corresponding to the first pixel electrode; determining, based on the first row and column position, a second row and column position of a second pixel electrode on a previous row sharing a same data line with the first pixel electrode, and obtaining a second gray value of the second pixel electrode that is stored in a row data buffer thereof; and obtaining a target charging voltage of the first pixel electrode based on the first gray value and the second gray value, and charging the first pixel electrode according to the target charging voltage or charging the first pixel electrode according to a charging voltage corresponding to the first gray value, the target charging voltage making image brightness corresponding to the first pixel electrode achieve the brightness corresponding to the first gray value.

Preferably, obtaining the target charging voltage of the first pixel electrode based on the first gray value and the second gray value comprises: inquiring a look up table by using the first gray value and the second gray value to obtain a compensation gray value of the first pixel electrode; and obtaining, based on the compensation gray value, the charging voltage corresponding to the first pixel electrode and serving the same as the target charging voltage.

Preferably, after charging the first pixel electrode according to the target charging voltage, said method further comprises: storing the first gray value in the row data buffer corresponding to the first pixel electrode and serving the same as gray value data of a previous row for a third pixel electrode on a next row, where the third pixel electrode and the first pixel electrode share a same data line.

Preferably, before obtaining the first row and column position of the first pixel electrode currently to be charged and the first gray value of a portion of the image corresponding to the first pixel electrode, said method further comprises: determining relative position between the first pixel electrode and the data line to which an initial pixel electrode on a first row and a first column is connected so as to determine an array architecture of the liquid crystal display panel.

Preferably, the second row and column position on the liquid crystal display panel at where the second pixel electrode is located is obtained according to the first row and column position and the array architecture of the liquid crystal display panel.

Preferably, the second gray value is determined to be 0 if the first pixel electrode is located on a first row on the triple-gate LCD panel.

Preferably, before obtaining the target charging voltage of the first pixel electrode based on the first gray value and the second gray value, and charging the first pixel electrode according to the target charging voltage or charging the first pixel electrode according to the charging voltage corresponding to the first gray value, said method further comprises: obtaining N gray values of pixel electrodes in sequence on a row where the first pixel electrode is located on, in which N is an even number greater than or equal to 8, and sequentially taking every two adjacent entities of the N gray values as a group and subtracting the gray value of an even column and the gray value of an odd column in each group from each other to obtain N/2 first gray value differences $S_1$ to $S_{N/2}$; sequentially taking every two adjacent entities of the N/2 first gray value differences as a group and subtracting the gray value of the even column and the gray value of the odd column in each group from each other to obtain N/4 second gray value differences $E_1$ to $E_{N/4}$; and determining to charge the first pixel electrode according to the target charging voltage or to charge the first pixel electrode according to the charging voltage corresponding to the first gray value, based on the relationship between the N/4 second gray value differences $E_1$ to $E_{N/4}$ and a predetermined first gray value difference threshold and the relationship between the N/2 first gray value differences $S_1$ to $S_{N/2}$ and a predetermined second gray value difference threshold, where the second gray value difference threshold is greater than the first gray value difference threshold.

Preferably, determining to charge the first pixel electrode according to the target charging voltage or to charge the first pixel electrode according to the charging voltage corresponding to the first gray value comprises: charging the first pixel electrode according to the charging voltage corresponding to the first gray value if the N/4 second gray value differences $E_1$ to $E_{N/4}$ are all equal to 0.

Preferably, determining to charge the first pixel electrode according to the target charging voltage or to charge the first pixel electrode according to the charging voltage corresponding to the first gray value comprises: determining whether or not the N/2 first gray value differences $S_1$ to $S_{N/2}$ are all greater than the second gray value difference threshold if the N/4 second gray value differences $E_1$ to $E_{N/4}$ are all less than the first gray value difference threshold; and if not, using the target charging voltage to charge the first pixel electrode.

Preferably, determining whether or not the N/2 first gray value differences $S_1$ to $S_{N/2}$ are all greater than the second gray value difference threshold comprises: obtaining the difference values between the gray values of the previous two pixel electrodes on a current row and corresponding gray values of a previous row stored in the row data buffer and determining whether or not the two difference values are all equal to the first gray value differences $S_1$ to $S_{N/2}$ if the N/2 first gray value differences $S_1$ to $S_{N/2}$ are all greater than the second gray value difference threshold; and if yes, using the charging voltage corresponding to the first gray value to charge the first pixel electrode; otherwise, using the target charging voltage to charge the first pixel electrode.

The beneficial effects of the present invention are described below.

In the color cast compensation method of the present invention, a first gray value of a first pixel electrode currently to be charged and a second gray value of a second pixel electrode sharing a same data line with the first pixel electrode are obtained, a target charging voltage of the first pixel electrode is obtained according to the first gray value and the second gray value, the first pixel electrode is charged according to the target charging voltage, and the target charging voltage may make image brightness corresponding to the first pixel electrode achieve the brightness corresponding to the first gray value. In the existing skills, the charging time of the pixel electrode of the triple-gate type is very short and insufficient charge for the pixel electrode is easily occurred, and therefore when foreground and background color difference is large, jaggies may appear due to insufficient charge for the pixel electrodes corresponding to foreground contour parts, and fonts become rough and it exercises a great influence on the display quality. Further, for a screen image formed by dark and bright pixels interlaced with each other or a screen image formed by two dark pixels and two bright pixels adjacent to and interlaced with each other, performing color cast compensation on the triple-gate LCD panel will make noise points appear on the screen image and the color cast compensation results may backfire. The present invention can solve above-described problems.

DESCRIPTION OF SPECIFIC EMBODIMENTS OF THE INVENTION

The following descriptions for the respective embodiments are specific embodiments capable of being implemented for illustrations of the present invention with referring to appending figures. In describing the present invention, spatially relative terms such as "upper", "lower", "front", "back", "left", "right", "inner", "outer", "lateral", and the like, may be used herein for ease of description as illustrated in the figures. Therefore, the spatially relative terms used herein are intended to illustrate the present invention for ease of understanding, but are not intended to limit the present invention. In the appending drawings, units with similar structures are indicated by the same reference numbers.

Embodiment I

Figure 1:
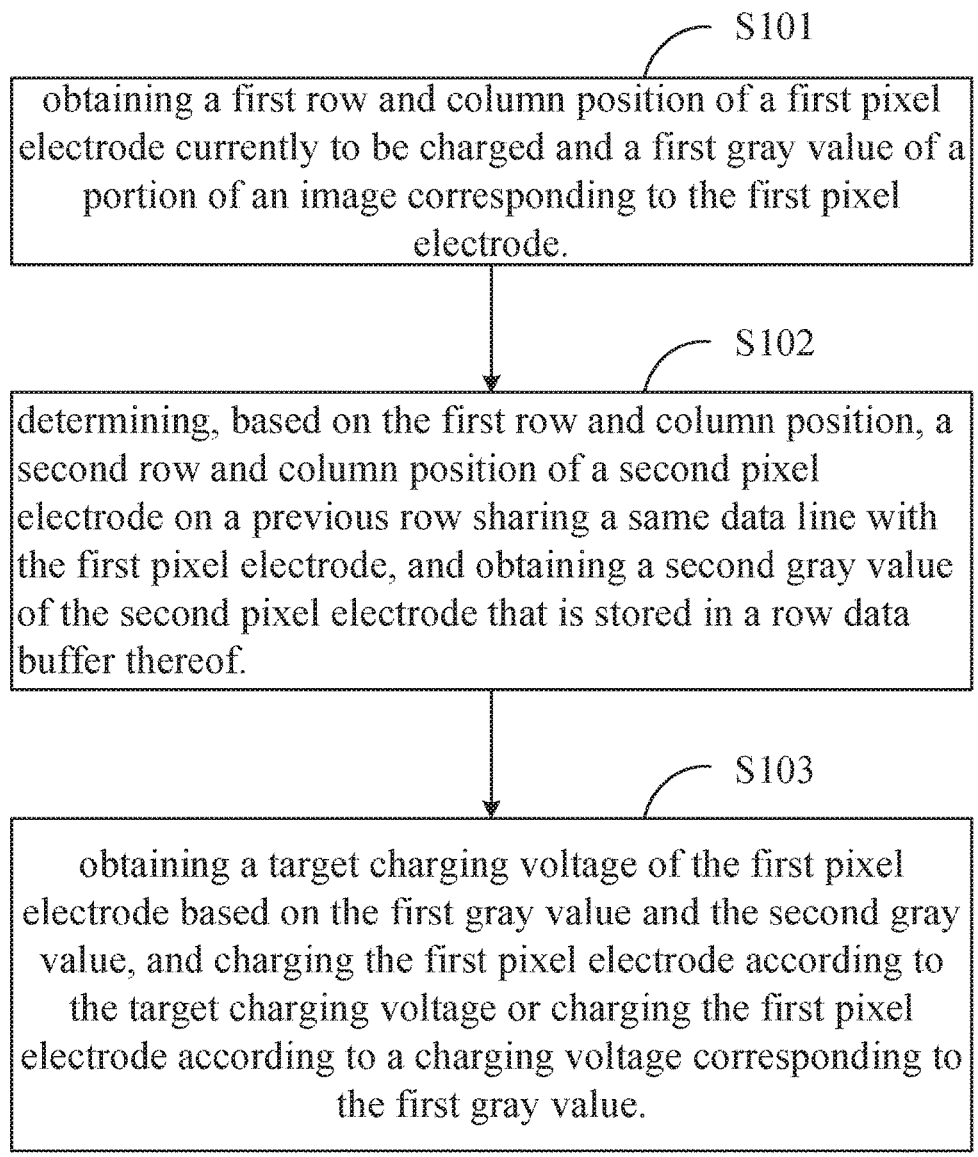
FIG. 1 is a flow chart of a color cast compensation method in accordance with an embodiment of the present invention.

Please refer to FIG. 1, which is a flow chart of a color cast compensation method in accordance with the present embodiment. As can be seen from FIG. 1, the color cast compensation method of the present invention is utilized for a triple-gate liquid crystal display (LCD) panel. The triple-gate LCD panel comprises a plurality of rows of gate lines and a plurality of columns of data lines. Said method comprises the following steps.

Step S101—obtaining a first row and column position of a first pixel electrode currently to be charged and a first gray value of a portion of an image corresponding to the first pixel electrode.

In the present embodiment, before obtaining the first row and column position of the first pixel electrode currently to be charged and the first gray value of a portion of the image corresponding to the first pixel electrode, said method further comprises: determining relative position between the first pixel electrode and the data line to which an initial pixel electrode on a first row and a first column is connected so as to determine an array architecture of the liquid crystal display panel.

Step S102—determining, based on the first row and column position, a second row and column position of a second pixel electrode on a previous row sharing a same data line with the first pixel electrode, and obtaining a second gray value of the second pixel electrode that is stored in a row data buffer thereof.

In the present embodiment, the second row and column position on the liquid crystal display panel at where the second pixel electrode is located is obtained according to the first row and column position and the array architecture of the liquid crystal display panel.

In the present embodiment, the second gray value is determined to be 0 if the first pixel electrode is located on a first row on the triple-gate LCD panel.

Step S103—obtaining a target charging voltage of the first pixel electrode based on the first gray value and the second gray value, and charging the first pixel electrode according to the target charging voltage or charging the first pixel electrode according to a charging voltage corresponding to the first gray value, the target charging voltage making image brightness corresponding to the first pixel electrode achieve the brightness corresponding to the first gray value. The charging voltage corresponding to the first gray value can also make image brightness corresponding to the first pixel electrode achieve the brightness corresponding to the first gray value.

In the present embodiment, obtaining the target charging voltage of the first pixel electrode based on the first gray value and the second gray value comprises: inquiring a look up table by using the first gray value and the second gray value to obtain a compensation gray value of the first pixel electrode; and obtaining, based on the compensation gray value, the charging voltage corresponding to the first pixel electrode and serving the same as the target charging voltage.

In the present embodiment, after charging the first pixel electrode according to the target charging voltage, said method further comprises: storing the first gray value in the row data buffer corresponding to the first pixel electrode and serving the same as gray value data of a previous row for a third pixel electrode on a next row, where the third pixel electrode and the first pixel electrode share a same data line.

In the color cast compensation method of the present invention, a first gray value of a first pixel electrode currently to be charged and a second gray value of a second pixel electrode sharing a same data line with the first pixel electrode are obtained, a target charging voltage of the first pixel electrode is obtained according to the first gray value and the second gray value, the first pixel electrode is charged according to the target charging voltage, and the target charging voltage may make image brightness corresponding to the first pixel electrode achieve the brightness corresponding to the first gray value. In the existing skills, the charging time of the pixel electrode of the triple-gate type is very short and insufficient charge for the pixel electrode is easily occurred, and therefore when foreground and background color difference is large, jaggies may appear due to insufficient charge for the pixel electrodes corresponding to foreground contour parts, and fonts become rough and it exercises a great influence on the display quality. Further, for a screen image formed by dark and bright pixels interlaced with each other or a screen image formed by two dark pixels and two bright pixels adjacent to and interlaced with each other, performing color cast compensation on the triple-gate LCD panel will make noise points appear on the screen image and the color cast compensation results may backfire. The present invention can solve above-described problems.

Embodiment II

Figure 2:
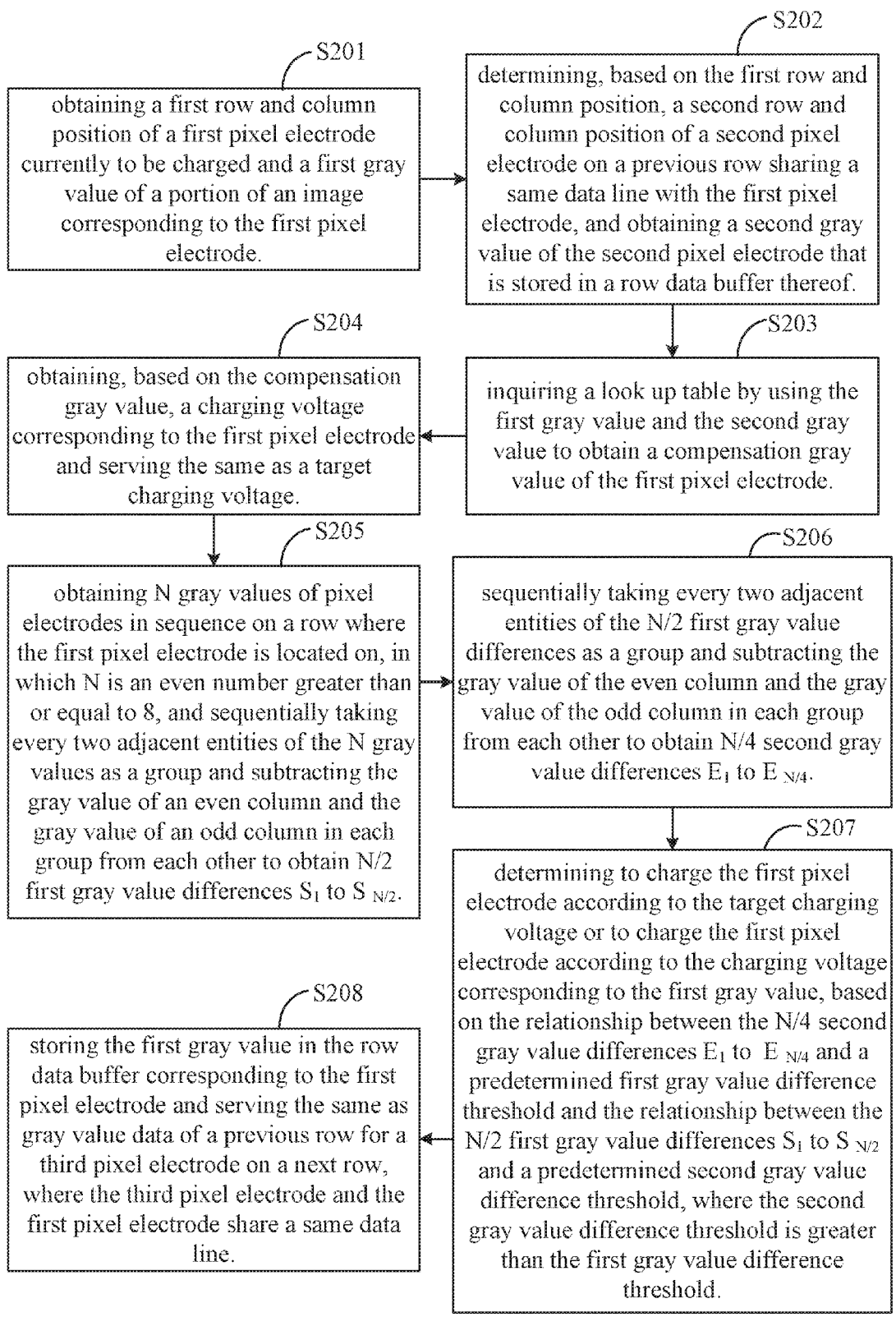
FIG. 2 is another flow chart of a color cast compensation method in accordance with an embodiment of the present invention.

Please refer to FIG. 2, which is another flow chart of a color cast compensation method in accordance with the present embodiment. As can be seen from FIG. 2, the color cast compensation method of the present invention is utilized for a triple-gate liquid crystal display (LCD) panel. The triple-gate LCD panel comprises a plurality of rows of gate lines and a plurality of columns of data lines. Said method comprises the following steps.

Step S201—obtaining a first row and column position of a first pixel electrode currently to be charged and a first gray value of a portion of an image corresponding to the first pixel electrode.

In the present embodiment, before obtaining the first row and column position of the first pixel electrode currently to be charged and the first gray value of a portion of the image corresponding to the first pixel electrode, said method further comprises: determining relative position between the first pixel electrode and the data line to which an initial pixel electrode on a first row and a first column is connected so as to determine an array architecture of the liquid crystal display panel.

Step S202—determining, based on the first row and column position, a second row and column position of a second pixel electrode on a previous row sharing a same data line with the first pixel electrode, and obtaining a second gray value of the second pixel electrode that is stored in a row data buffer thereof.

In the present embodiment, the second row and column position on the liquid crystal display panel at where the second pixel electrode is located is obtained according to the first row and column position and the array architecture of the liquid crystal display panel.

In the present embodiment, the second gray value is determined to be 0 if the first pixel electrode is located on a first row on the triple-gate LCD panel.

Step S203—inquiring a look up table by using the first gray value and the second gray value to obtain a compensation gray value of the first pixel electrode.

In this step, the look up table is illustrated below.

| | Look up Table | | | | | | | | | |
|---|---|---|---|---|---|---|---|---|---|---|
| | | Previous row | | | | | | | | |
| Current row | Gray value | 0 | 32 | 64 | 96 | 128 | 160 | 192 | 224 | 255 |
| | 0 | 0 | 0 | 0 | 0 | 0 | 0 | 0 | 0 | 0 |
| | 32 | 34 | 32 | 31 | 31 | 31 | 30 | 30 | 30 | 28 |
| | 64 | 67 | 64 | 64 | 63 | 62 | 62 | 61 | 61 | 56 |
| | 96 | 99 | 96 | 96 | 96 | 94 | 94 | 93 | 93 | 88 |
| | 128 | 131 | 128 | 128 | 128 | 128 | 126 | 125 | 124 | 120 |
| | 160 | 163 | 160 | 160 | 160 | 160 | 160 | 158 | 157 | 151 |
| | 192 | 195 | 192 | 192 | 192 | 192 | 192 | 192 | 189 | 185 |
| | 224 | 255 | 224 | 224 | 224 | 224 | 224 | 224 | 224 | 220 |
| | 255 | 255 | 255 | 255 | 255 | 255 | 255 | 255 | 255 | 255 |

Step S204—obtaining, based on the compensation gray value, a charging voltage corresponding to the first pixel electrode and serving the same as a target charging voltage, the target charging voltage making image brightness corresponding to the first pixel electrode achieve the brightness corresponding to the first gray value.

In this step, if the compensation gray value is 0, serve the charging voltage corresponding to the first gray value as the charging voltage of the first pixel electrode, and meanwhile the charging voltage corresponding to the first gray value is identical to the target charging voltage. Meanwhile, the charging voltage corresponding to the first gray value can also make image brightness corresponding to the first pixel electrode achieve the brightness corresponding to the first gray value.

Step S205—obtaining N gray values of pixel electrodes in sequence on a row where the first pixel electrode is located on, in which N is an even number greater than or equal to 8, and sequentially taking every two adjacent entities of the N gray values as a group and subtracting the gray value of an even column and the gray value of an odd column in each group from each other to obtain N/2 first gray value differences $S_1$ to $S_{N/2}$.

Step S206—sequentially taking every two adjacent entities of the N/2 first gray value differences as a group and subtracting the gray value of the even column and the gray value of the odd column in each group from each other to obtain N/4 second gray value differences $E_1$ to $E_{N/4}$.

Step S207—determining to charge the first pixel electrode according to the target charging voltage or to charge the first pixel electrode according to the charging voltage corresponding to the first gray value, based on the relationship between the N/4 second gray value differences E1 to E N/4 and a predetermined first gray value difference threshold and the relationship between the N/2 first gray value differences S1 to S N/2 and a predetermined second gray value difference threshold, where the second gray value difference threshold is greater than the first gray value difference threshold.

Figure 3:
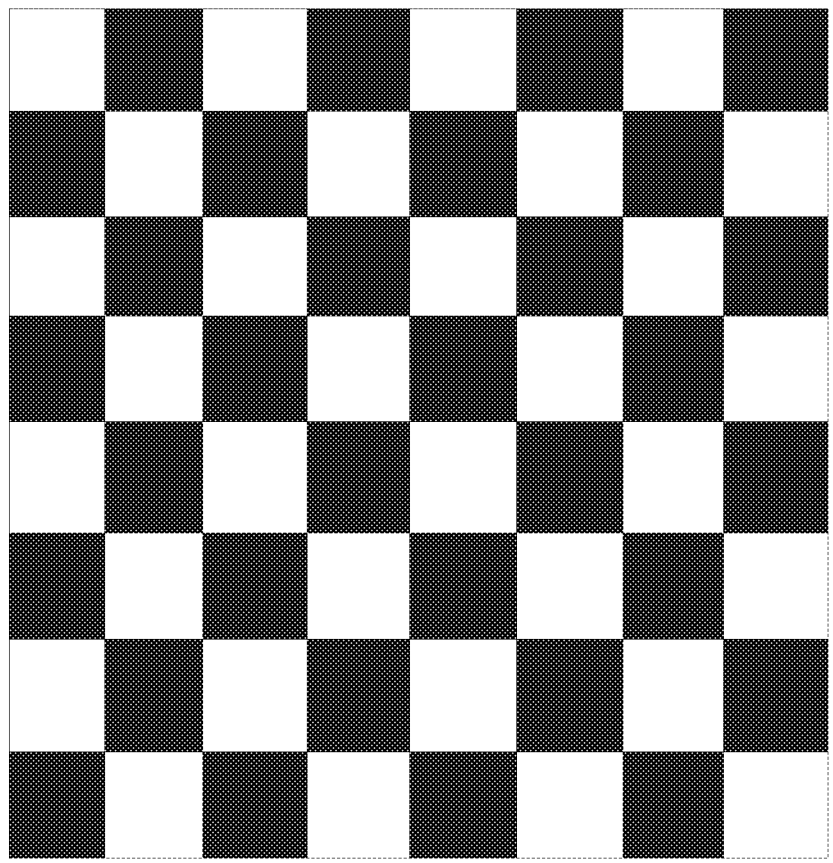
FIG. 3 is a diagram showing a screen image formed by dark and bright pixels interlaced with each other in accordance with a triple-gate LCD panel of an embodiment of the present invention.
Figure 4:
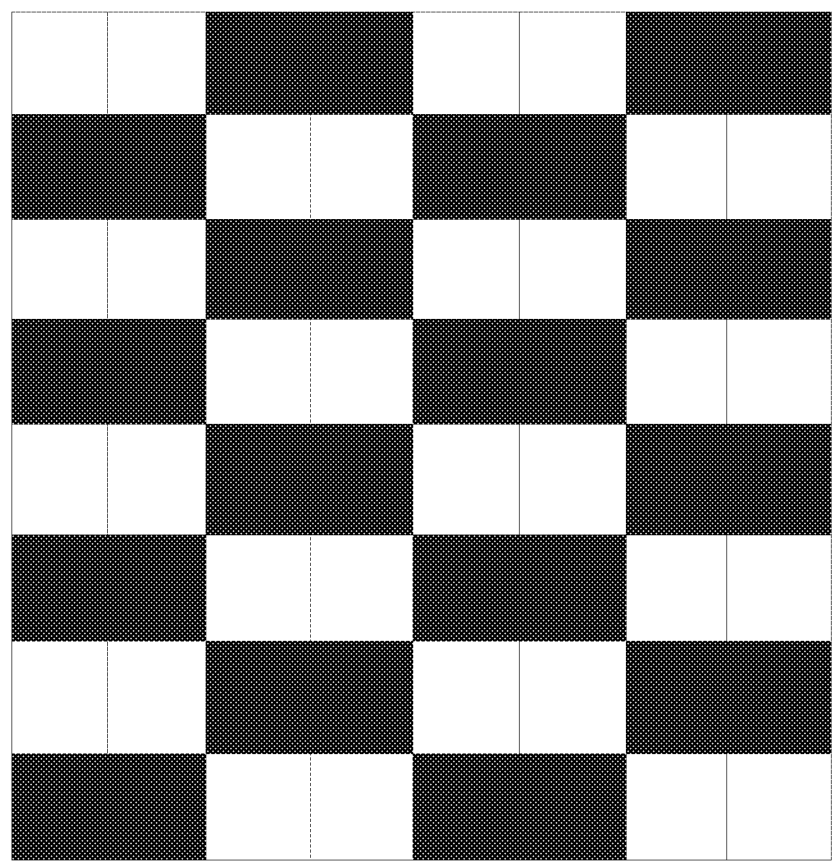
FIG. 4 is a diagram showing a screen image formed by two dark pixels and two bright pixels adjacent to and interlaced with each other in accordance with a triple-gate LCD panel of an embodiment of the present invention.

Please refer to FIGS. 3 and 4. FIG. 3 is a diagram showing a screen image formed by dark and bright pixels interlaced with each other in accordance with a triple-gate LCD panel of an embodiment of the present invention. FIG. 4 is a diagram showing a screen image formed by two dark pixels and two bright pixels adjacent to and interlaced with each other in accordance with a triple-gate LCD panel of an embodiment of the present invention. When the screen images shown in FIG. 3 and FIG. 4 appear on the liquid crystal display panel, the screen images may become much blur and side effects become more serious if the color cast compensation is continuously performed on the pixel electrodes. Therefore, when a screen image formed by dark and bright pixels interlaced with each other or a screen image formed by two dark pixels and two bright pixels adjacent to and interlaced with each other appears on the liquid crystal display panel, it is necessary to stop performing the color cast compensation on the pixel electrode, and instead, it has to charge the pixel electrodes according to the charging voltage corresponding to the gray values of the pixel electrodes.

In the present embodiment, determining to charge the first pixel electrode according to the target charging voltage or to charge the first pixel electrode according to the charging voltage corresponding to the first gray value in Step S207 may comprise: charging the first pixel electrode according to the charging voltage corresponding to the first gray value if the N/4 second gray value differences $E_1$ to $E_{N/4}$ are all equal to 0. Meanwhile, for the screen images of FIG. 3 and FIG. 4, it can be determined that the instant screen image of the liquid crystal display panel is a screen image formed by dark and bright pixels interlaced with each other or a screen image formed by two dark pixels and two bright pixels adjacent to and interlaced with each other, and therefore it is necessary to stop performing the color cast compensation on the first pixel electrode. That is, it is not appropriate to use the target charging voltage to charge the first pixel electrode. Instead, the charging voltage corresponding to the first gray value should be used to charge the first pixel electrode.

In the present embodiment, determining to charge the first pixel electrode according to the target charging voltage or to charge the first pixel electrode according to the charging voltage corresponding to the first gray value may comprise: determining whether or not the N/2 first gray value differences $S_1$ to $S_{N/2}$ are all greater than the second gray value difference threshold if the N/4 second gray value differences $E_1$ to $E_{N/4}$ are all less than the first gray value difference threshold.

If the N/2 first gray value differences $S_1$ to $S_{N/2}$ are not all greater than the second gray value difference threshold, it can be determined, according to FIG. 3 and FIG. 4, that the instant screen image of the liquid crystal display panel is not a screen image formed by dark and bright pixels interlaced with each other or is not a screen image formed by two dark pixels and two bright pixels adjacent to and interlaced with each other, and the target charging voltage can now be used to charge the first pixel electrode for the color cast compensation.

In the present embodiment, determining whether or not the N/2 first gray value differences S1 to S N/2 are all greater than the second gray value difference threshold may comprise: obtaining the difference values between the gray values of the previous two pixel electrodes on a current row and corresponding gray values of a previous row stored in the row data buffer and determining whether or not the two difference values are all equal to the first gray value differences $S_1$ to $S_{N/2}$ if the N/2 first gray value differences $S_1$ to $S_{N/2}$ are all greater than the second gray value difference threshold.

If the two difference values are all equal to the first gray value differences $S_1$ to $S_{N/2}$, it can be determined, according to FIG. 3 and FIG. 4, that the instant screen image of the liquid crystal display panel is a screen image formed by dark and bright pixels interlaced with each other or a screen image formed by two dark pixels and two bright pixels adjacent to and interlaced with each other, and the charging voltage corresponding to the first gray value can be used to charge the first pixel electrode; otherwise, the target charging voltage is used to charge the first pixel electrode.

Step S208—storing the first gray value in the row data buffer corresponding to the first pixel electrode and serving the same as gray value data of a previous row for a third pixel electrode on a next row, where the third pixel electrode and the first pixel electrode share a same data line.

In the color cast compensation method of the present invention, a first gray value of a first pixel electrode currently to be charged and a second gray value of a second pixel electrode sharing a same data line with the first pixel electrode are obtained, a target charging voltage of the first pixel electrode is obtained according to the first gray value and the second gray value, the first pixel electrode is charged according to the target charging voltage, and the target charging voltage may make image brightness corresponding to the first pixel electrode achieve the brightness corresponding to the first gray value. In the existing skills, the charging time of the pixel electrode of the triple-gate type is very short and insufficient charge for the pixel electrode is easily occurred, and therefore when foreground and background color difference is large, jaggies may appear due to insufficient charge for the pixel electrodes corresponding to foreground contour parts, and fonts become rough and it exercises a great influence on the display quality. Further, for a screen image formed by dark and bright pixels interlaced with each other or a screen image formed by two dark pixels and two bright pixels adjacent to and interlaced with each other, performing color cast compensation on the triple-gate LCD panel will make noise points appear on the screen image and the color cast compensation results may backfire. The present invention can solve above-described problems.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A color cast compensation method, utilized for a triple-gate liquid crystal display (LCD) panel, the triple-gate LCD panel comprising a plurality of rows of gate lines and a plurality of columns of data lines, said method comprising the steps of:
   obtaining a first row and column position of a first pixel electrode currently to be charged and a first gray value of a portion of an image corresponding to the first pixel electrode;
   determining, based on the first row and column position, a second row and column position of a second pixel electrode on a previous row sharing a same data line with the first pixel electrode, and obtaining a second gray value of the second pixel electrode that is stored in a row data buffer thereof; and
   obtaining a target charging voltage of the first pixel electrode based on the first gray value and the second gray value, and charging the first pixel electrode according to the target charging voltage or charging the first pixel electrode according to a charging voltage corresponding to the first gray value, the target charging voltage making image brightness corresponding to the first pixel electrode achieve the brightness corresponding to the first gray value;
   wherein obtaining the target charging voltage of the first pixel electrode based on the first gray value and the second gray value comprises:
   inquiring a look up table by using the first gray value and the second gray value to obtain a compensation gray value of the first pixel electrode; and
   obtaining, based on the compensation gray value, the charging voltage corresponding to the first pixel electrode and serving the same as the target charging voltage;
   wherein after charging the first pixel electrode according to the target charging voltage, said method further comprises:
   storing the first gray value in the row data buffer corresponding to the first pixel electrode and serving the same as gray value data of a previous row for a third pixel electrode on a next row, where the third pixel electrode and the first pixel electrode share a same data line;
   wherein before obtaining the target charging voltage of the first pixel electrode based on the first gray value and the second gray value, and charging the first pixel electrode according to the target charging voltage or charging the first pixel electrode according to the charging voltage corresponding to the first gray value, said method further comprises:

obtaining N gray values of pixel electrodes in sequence on a row where the first pixel electrode is located on, in which N is an even number greater than or equal to 8, and sequentially taking every two adjacent entities of the N gray values as a group and subtracting the gray value of an even column and the gray value of an odd column in each group from each other to obtain N/2 first gray value differences $S_1$ to $S_{N/2}$;
   sequentially taking every two adjacent entities of the N/2 first gray value differences as a group and subtracting the gray value of the even column and the gray value of the odd column in each group from each other to obtain N/4 second gray value differences $E_1$ to $E_{N/4}$; and
   determining to charge the first pixel electrode according to the target charging voltage or to charge the first pixel electrode according to the charging voltage corresponding to the first gray value, based on the relationship between the N/4 second gray value differences $E_1$ to $E_{N/4}$ and a predetermined first gray value difference threshold and the relationship between the N/2 first gray value differences $S_1$ to $S_{N/2}$ and a predetermined second gray value difference threshold, where the second gray value difference threshold is greater than the first gray value difference threshold.

2. The color cast compensation method according to claim 1, wherein before obtaining the first row and column position of the first pixel electrode currently to be charged and the first gray value of a portion of the image corresponding to the first pixel electrode, said method further comprises:
   determining relative position between the first pixel electrode and the data line to which an initial pixel electrode on a first row and a first column is connected so as to determine an array architecture of the liquid crystal display panel.

3. The color cast compensation method according to claim 1, wherein the second row and column position on the liquid crystal display panel at where the second pixel electrode is located is obtained according to the first row and column position and the array architecture of the liquid crystal display panel.

4. The color cast compensation method according to claim 1, wherein the second gray value is determined to be 0 if the first pixel electrode is located on a first row on the triple-gate LCD panel.

5. The color cast compensation method according to claim 1, wherein determining to charge the first pixel electrode according to the target charging voltage or to charge the first pixel electrode according to the charging voltage corresponding to the first gray value comprises:
   charging the first pixel electrode according to the charging voltage corresponding to the first gray value if the N/4 second gray value differences $E_1$ to $E_{N/4}$ are all equal to 0.

6. The color cast compensation method according to claim 1, wherein determining to charge the first pixel electrode according to the target charging voltage or to charge the first pixel electrode according to the charging voltage corresponding to the first gray value comprises:
   determining whether or not the N/2 first gray value differences $S_1$ to $S_{N/2}$ are all greater than the second gray value difference threshold if the N/4 second gray value differences $E_1$ to $E_{N/4}$ are all less than the first gray value difference threshold; and
   if not, using the target charging voltage to charge the first pixel electrode.

7. The color cast compensation method according to claim 6, wherein determining whether or not the N/2 first gray value differences $S_1$ to $S_{N/2}$ are all greater than the second gray value difference threshold comprises:
  obtaining the difference values between the gray values of the previous two pixel electrodes on a current row and corresponding gray values of a previous row stored in the row data buffer and determining whether or not the two difference values are all equal to the first gray value differences $S_1$ to $S_{N/2}$ if the N/2 first gray value differences $S_1$ to $S_{N/2}$ are all greater than the second gray value difference threshold; and
  if yes, using the charging voltage corresponding to the first gray value to charge the first pixel electrode; otherwise, using the target charging voltage to charge the first pixel electrode.

8. A color cast compensation method, utilized for a triple-gate liquid crystal display (LCD) panel, the triple-gate LCD panel comprising a plurality of rows of gate lines and a plurality of columns of data lines, said method comprising the steps of:
  obtaining a first row and column position of a first pixel electrode currently to be charged and a first gray value of a portion of an image corresponding to the first pixel electrode;
  determining, based on the first row and column position, a second row and column position of a second pixel electrode on a previous row sharing a same data line with the first pixel electrode, and obtaining a second gray value of the second pixel electrode that is stored in a row data buffer thereof; and
  obtaining a target charging voltage of the first pixel electrode based on the first gray value and the second gray value, and charging the first pixel electrode according to the target charging voltage or charging the first pixel electrode according to a charging voltage corresponding to the first gray value, the target charging voltage making image brightness corresponding to the first pixel electrode achieve the brightness corresponding to the first gray value,
  wherein before obtaining the target charging voltage of the first pixel electrode based on the first gray value and the second gray value, and charging the first pixel electrode according to the target charging voltage or charging the first pixel electrode according to the charging voltage corresponding to the first gray value, said method further comprises:
  obtaining N gray values of pixel electrodes in sequence on a row where the first pixel electrode is located on, in which N is an even number greater than or equal to 8, and sequentially taking every two adjacent entities of the N gray values as a group and subtracting the gray value of an even column and the gray value of an odd column in each group from each other to obtain N/2 first gray value differences $S_1$ to $S_{N/2}$;
  sequentially taking every two adjacent entities of the N/2 first gray value differences as a group and subtracting the gray value of the even column and the gray value of the odd column in each group from each other to obtain N/4 second gray value differences $E_1$ to $E_{N/4}$; and
  determining to charge the first pixel electrode according to the target charging voltage or to charge the first pixel electrode according to the charging voltage corresponding to the first gray value, based on the relationship between the N/4 second gray value differences $E_1$ to $E_{N/4}$ and a predetermined first gray value difference threshold and the relationship between the N/2 first gray value differences $S_1$ to $S_{N/2}$ and a predetermined second gray value difference threshold, where the second gray value difference threshold is greater than the first gray value difference threshold.

9. The color cast compensation method according to claim 8, wherein obtaining the target charging voltage of the first pixel electrode based on the first gray value and the second gray value comprises:
  inquiring a look up table by using the first gray value and the second gray value to obtain a compensation gray value of the first pixel electrode; and
  obtaining, based on the compensation gray value, the charging voltage corresponding to the first pixel electrode and serving the same as the target charging voltage.

10. The color cast compensation method according to claim 8, wherein after charging the first pixel electrode according to the target charging voltage, said method further comprises:
  storing the first gray value in the row data buffer corresponding to the first pixel electrode and serving the same as gray value data of a previous row for a third pixel electrode on a next row, where the third pixel electrode and the first pixel electrode share a same data line.

11. The color cast compensation method according to claim 8, wherein before obtaining the first row and column position of the first pixel electrode currently to be charged and the first gray value of a portion of the image corresponding to the first pixel electrode, said method further comprises:
  determining relative position between the first pixel electrode and the data line to which an initial pixel electrode on a first row and a first column is connected so as to determine an array architecture of the liquid crystal display panel.

12. The color cast compensation method according to claim 11, wherein the second row and column position on the liquid crystal display panel at where the second pixel electrode is located is obtained according to the first row and column position and the array architecture of the liquid crystal display panel.

13. The color cast compensation method according to claim 8, wherein the second gray value is determined to be 0 if the first pixel electrode is located on a first row on the triple-gate LCD panel.

14. The color cast compensation method according to claim 8, wherein determining to charge the first pixel electrode according to the target charging voltage or to charge the first pixel electrode according to the charging voltage corresponding to the first gray value comprises:
  charging the first pixel electrode according to the charging voltage corresponding to the first gray value if the N/4 second gray value differences $E_1$ to $E_{N/4}$ are all equal to 0.

15. The color cast compensation method according to claim 8, wherein determining to charge the first pixel electrode according to the target charging voltage or to charge the first pixel electrode according to the charging voltage corresponding to the first gray value comprises:
  determining whether or not the N/2 first gray value differences $S_1$ to $S_{N/2}$ are all greater than the second gray value difference threshold if the N/4 second gray value differences $E_1$ to $E_{N/4}$ are all less than the first gray value difference threshold; and if not, using the target charging voltage to charge the first pixel electrode.

16. The color cast compensation method according to claim 15, wherein determining whether or not the N/2 first gray value differences $S_1$ to $S_{N/2}$ are all greater than the second gray value difference threshold comprises:

obtaining the difference values between the gray values of the previous two pixel electrodes on a current row and corresponding gray values of a previous row stored in the row data buffer and determining whether or not the two difference values are all equal to the first gray value differences $S_1$ to $S_{N/2}$ if the N/2 first gray value differences $S_1$ to $S_{N/2}$ are all greater than the second gray value difference threshold; and if yes, using the charging voltage corresponding to the first gray value to charge the first pixel electrode; otherwise, using the target charging voltage to charge the first pixel electrode.

* * * * *